C. O. OLDFIELD.
TELEPHONE ATTACHMENT.
APPLICATION FILED JUNE 7, 1916.

1,201,083.

Patented Oct. 10, 1916.

Witness
Chas H. Trotter.

Inventor
Charles O. Oldfield
By Geo. E. Tew
Attorney

UNITED STATES PATENT OFFICE.

CHARLES O. OLDFIELD, OF CANTON, KANSAS.

TELEPHONE ATTACHMENT.

1,201,083.  Specification of Letters Patent.  Patented Oct. 10, 1916.

Application filed June 7, 1916. Serial No. 102,220.

*To all whom it may concern:*

Be it known that I, CHARLES O. OLDFIELD, a citizen of the United States, residing at Canton, in the county of McPherson and State of Kansas, have invented certain new and useful Improvements in Telephone Attachments, of which the following is a specification.

This invention relates to attachments for telephones, and comprises a device which operates in connection with the receiver switch hook for the purpose of enabling a person on a party line to listen in without using his battery or being heard on the line.

More particularly stated, it comprises a device which, when the receiver is removed from the hook, will in one position close the receiver circuits, by a partial movement of the switch hook, enabling the party to listen in, and which in another position will permit further movement of the switch hook to provide for the ordinary use of the telephone.

The invention therefore provides a device which will permit listening in, without the use of the party battery.

Figure 1:
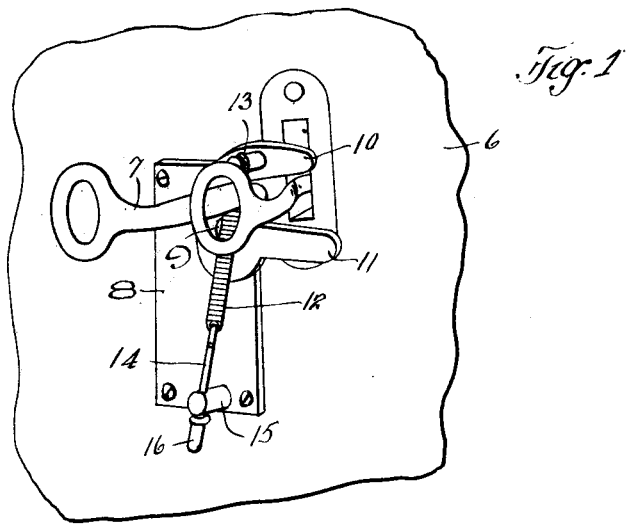
Figure 2:
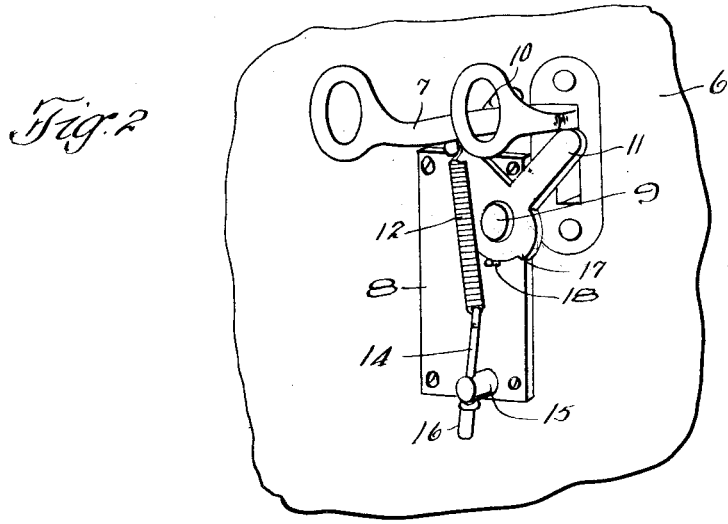

In the accompanying drawings, Figure 1 is a perspective view of the device in one position. Fig. 2 is a similar view in another position.

Referring specifically to the drawings, 6 indicates an ordinary telephone casing or box and 7 the receiver switch hook, which lifts and drops in the usual manner, when the receiver is off or on the hook. The device forming the present invention consists of a plate 8 which is fastened to the side of the box, and to this plate is pivoted, by a pin 9, a forked catch consisting of a plate having an upper finger 10 and a lower finger 11, and the plate is so positioned that the fingers project above and below the shank of the receiver hook. The space between the fingers is such that a limited or partial movement of the hook is possible the upper finger 10 occupying, normally, a position slightly above the hook when the latter is dropped to its full extent, as when the receiver hangs thereon. A spring 12 is connected to the pivoted plate at one end, as indicated at 13, and to a screw-eye 14 at the other end, the screw extending loosely through a hole in a stud 15 on the plate 8, and receiving an adjusting nut 16 behind the stud, whereby the tension of the spring may be adjusted. The lower arm 11 has a projection 17 arranged to stop against a pin 18 in one position, and the spring is so arranged that it will throw beyond center to one side or the other of the pivot 9, according to the movement of the catch plate.

With the parts arranged as stated, when the receiver is on the hook, the latter is pulled down as usual. To listen in, the receiver is removed from the hook, and the hook lifts until it strikes the upper arm 10 as shown in Fig. 1, where it is stopped, the tension of the spring 12 being sufficient for this purpose. This movement, however, closes the receiver circuit, and the party is able to listen in on the line, without making any noise on the line and without bringing his batteries in circuit. If the party wishes to talk, he removes the receiver from the hook as usual, and at the same time pushes up the hook with sufficient force to overcome the spring, which swings over beyond center, and the catch plate swings up, as shown in Fig. 2, permitting the hook to lift to the full extent and close all the circuits. When the receiver is replaced on the hook the latter drops and by contact with the lower arm 11 restores all parts to original position.

The device may be readily applied to existing telephones and forms a simple and inexpensive means for accomplishing the purpose stated.

What I claim is:

1. The combination with a telephone receiver switch hook, of a catch projecting across the line of movement of the hook when the receiver is removed therefrom, in position to stop said movement after the receiver circuit is closed and before the transmitter circuit is closed, and a spring connected to said catch and yieldable to permit full movement of the hook when desired, the strength of the spring being sufficient to overcome the lifting pressure of the switch hook and normally hold the catch in stop position.

2. An attachment for telephones, comprising a pivoted catch having upper and lower fingers adapted to receive a receiver switch hook therebetween, and spaced to permit partial movement of said hook when the receiver is off the hook, and a spring connected to said catch and yieldable to permit full movement of the hook when desired.

3. An attachment for telephones comprising a pivoted catch having upper and lower arms spaced to receive a receiver switch hook therebetween, and a spring connected to the catch and adapted to swing across the pivot center to hold the catch in either of two positions, permitting partial lift of the hook in one of said positions, and complete lift thereof in the other.

In testimony whereof, I affix my signature in presence of two witnesses.

CHARLES O. OLDFIELD.

Witnesses:
J. W. WILSON,
EMMA M. STRICKLER.

Copies of this patent may be obtained for five cents each, by addressing the "Commissioner of Patents, Washington, D. C."